3,072,466
METHOD OF CRYSTALLIZING SODIUM BICARBONATE
William C. Bauer, Green River, Wyo., and Allen P. McCue, Norwalk, and Kenneth C. Rule, Noroton Heights, Conn., assignors to FMC Corporation, a corporation of Delaware
Filed Aug. 12, 1960, Ser. No. 49,382
8 Claims. (Cl. 23—300)

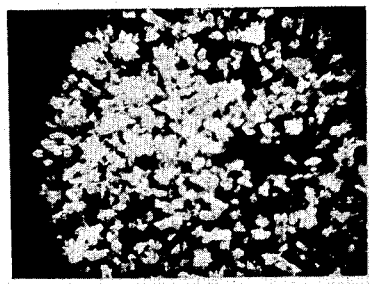
Fig. 5
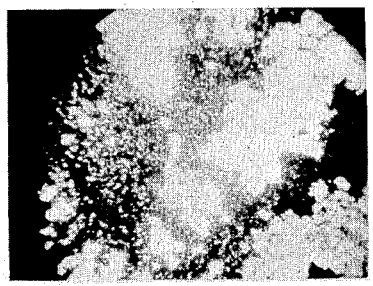
Fig. 9
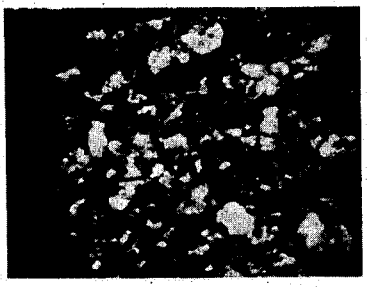
Fig. 6
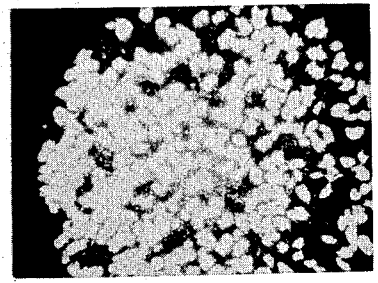
Fig. 10
Fig. 7
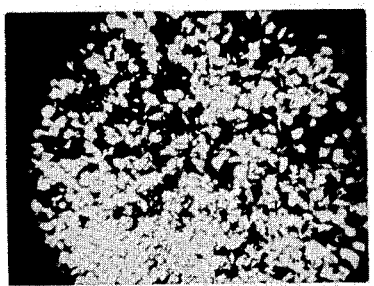
Fig. 11
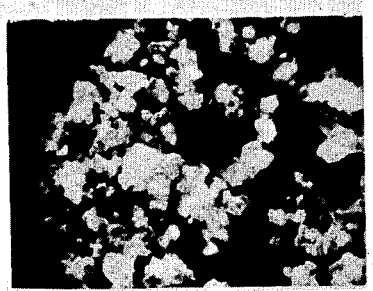
Fig. 8
Fig. 12
INVENTORS
WILLIAM C. BAUER
ALLEN P. McCUE
KENNETH G. RULE
BY
ATTORNEYS

# United States Patent Office 3,072,466
Patented Jan. 8, 1963

This invention relates to improvements in the method of crystallizing certain inorganic salts, particularly those containing sodium and bicarbonate ions, and more particularly sodium bicarbonate from an aqueous solution.

This application is a continuation-in-part of our copending application Serial No. 474,828, filed December 13, 1954, now Patent No. 2,954,282.

As is well known, when the solubility of an inorganic salt in a solvent is exceeded, as by sufficiently lowering the temperature of an unsaturated solution or by introducing an excess of one or more of the ions involved, the salt is deposited in solid form. This method is perhaps the most commonly used process for the production of crystalline salts, and is exemplified in the production of sodium sesquicarbonate, where impure trona mineral is mined and purified by recrystallization from a hot, aqueous solution as described, for example, in the Pike U.S. Patent No. 2,639,217. The second method is exemplified by the production of sodium bicarbonate in the ammonia soda process.

In many cases, the type of salt crystals obtained by such methods are of decidedly inferior quality, considering such factors as crystal shape, purity, settling rate, size, uniformity, dewaterability, resistance to breakage and bulk density. The attainment of the desired results as to these characteristics has long been a problem in the ammonia soda process of manufacturing sodium bicarbonate, which product is largely converted to soda ash as the final market commodity. Inferiority of the intermediate bicarbonate ordinarily leads to inferiority in the final soda ash product.

It is accordingly an object of the present invention to provide a novel method for obtaining sodium bicarbonate of greatly improved quality and the product produced thereby.

Another object of the present invention is to provide such a method which is practical and economically feasible.

Other objects and advantages of the invention will appear from a consideration of the following disclosure and the attached illustrations.

We have discovered that the shortcomings and disadvantages of the prior art methods of crystallizing sodium bicarbonate are largely eliminated by the use of very small concentrations of an anionic-active surface active agent. Adopting the name commonly used by chemists, surface active agents are herein called "surfactants."

The preferred types of these anionic-active surfactants are organic sulfate (organosulfate) or sulfonate (organosulfonate) derivatives, and of these preferred subclasses, the preferred sulfonates are alkyl benzene or alkyl naphthalene sulfonates wherein alkyl carbons total at least four and desirably more, and the preferred sulfates are the higher alkyl alcohol sulfates. Thus, particularly effective compounds are dodecyl benzene sulfonate and polypropylene benzene sulfonates ranging from $C_{10-18}$ alkyl groups; and dibutyl or diisopropyl naphthalene sulfonate.

Another preferred sub-class, related to the foregoing preferred sub-classes, are the taurates derived from N-alkyltaurine ($RNHCH_2CH_2SO_3H$) and fatty acids, containing a fatty acid residue of substantial length, i.e., at least 8 carbon atoms. Examples are sodium-N-methyl-N-lauryl taurate, sodium-N-cyclohexyl-N-palmityl taurate, sodium-N-methyl taurate of tallow acids and sodium-N-methyl-N-oleyl taurate. Taurates containing lower molecular weight fatty acid substituent groups are proportionately less effective.

The primary alcohol sulfates containing alkyl groups of substantial size, such as those based on lauryl alcohols, are very effective additives. Examples are sodium, ammonium and triethanolamine lauryl sulfates. Primary alcohol sulfates containing smaller alkyl groups, e.g. on the order of only $C_8$ alkyl groups, are proportionately less effective and are not recommended. The practical upper limit is about $C_{18}$ groups. Examples in the $C_{8-18}$ range include: sodium octyl sulfate, sodium lauryl sulfate, ammonium lauryl sulfate, triethanolamine lauryl sulfate, sodium coconut alcohol sulfate, sodium tridecyl alcohol sulfate, sodium tallow alcohol sulfate, sodium cetyl sulfate and sodium oleyl sulfate.

It appears that in general the free acids of these various surfactants may be used, because they are converted to the sodium salts in the process liquors, which are mildly alkaline, and thus function the same as the soluble salts of the additives.

Cationic-active and nonionic surfactants are totally ineffective as additives in improving the crystallization of sodium bicarbonate. Various theories have been considered in an effort to explain the clearly established, unique effectiveness of the anionic-active surfactants— particularly the sub-classes above enumerated—and the complete lack of effectiveness of the cationic and nonionic classes. In general, these theories have all failed to fully explain this unexpected result.

From about 10 to about 800 parts per million (p.p.m.) of an anionic surfactant are recommended in the crystallization of sodium bicarbonate, depending upon the conditions of crystallization and the particular surfactant used. Levels below 5 p.p.m. show beneficial effect but are not the preferred concentration. Similarly amounts in excess of 400 p.p.m. may be used with beneficial results, but complicating effects may begin to appear at the higher levels, such as greater crystal twinning or branching and contamination of the product, and the use of these higher concentrations is uneconomical. The levels specified herein refer to the active content of the various commercial preparations available unless otherwise noted.

In the preparation of sodium bicarbonate by the ammonia soda process, it has been found necessary in laboratory scale runs to use slightly higher concentrations of the additive, up to about 300–400 p.p.m., but preferably on the order of about 40 to 400 p.p.m., in the liquor from which the sodium bicarbonate is crystallized or precipitated by the introduction of carbon dioxide. However, such higher levels were also found in general to be necessary in the sesquicarbonate laboratory testing, to accentuate differences on small scale runs. In contrast, plant scale tests showed great differences resulting from the use of surfactants, where the levels used needed to be only a few percent of those utilized in the laboratory scale runs.

The distinct benefits by the use of surfactants in the preparation of sodium bicarbonate crystals are also observed where the crystallization is effected by cooling a solution substantially saturated with sodium bicarbonate. Without an additive, as illustrated in FIGURE 1, the particles illustrated are agglomerates of very fine crystals. In contrast, as shown in FIGURE 2, the use of a surfactant gives crystals of greatly increased size, distinct in shape and single in form instead of being a cluster of indistinguishable crystals as shown in FIGURE 1. Needless to say, the material illustrated in FIGURE 2 is of greatly improved commercial utility, because of the many improved benefits inherent in such crystalline structure.

In the crystallization of sodium bicarbonate the surfactant is preferably introduced in or just ahead of the cooling and/or crystallization step and results in a change in crystal habit and size. The use of the surfactants herein described increases the crystal size and reduces the amount of agglomeration, resulting in producing sodium bicarbonate crystals which have a higher bulk density, settle faster and retain less moisture when filtered from the solution. A large amount of mother liquor on the filtered crystals decreases the purity of the product and when the bicarbonate crystals are calcined to produce soda ash the larger amount of moisture reduces the efficiency of the calcining operation. Thus the processes herein described result in substantial improvements in the production of soda ash by the ammonia soda process and helps overcome the problems of excessive fineness and excessive fragility of the sodium bicarbonate crystals leading to excessive breakage in handling, non-uniformity in particle size, excess dustiness of the soda ash product due to fine crystals, low bulk density and unsatisfactory purity due to incomplete removal of mother liquor in the centrifuging or filtering operations.

The invention will be better understood from a consideration of the following examples, and a reference to the attached illustrations. These illustrations are reflection photomicrographs of sodium bicarbonate crystals which clearly demonstrate the invention described and claimed herein, and are identified as follows:

SHEET 1—SODIUM BICARBONATE CRYSTALS TAKEN AT 25× MAGNIFICATION

Figure 1:
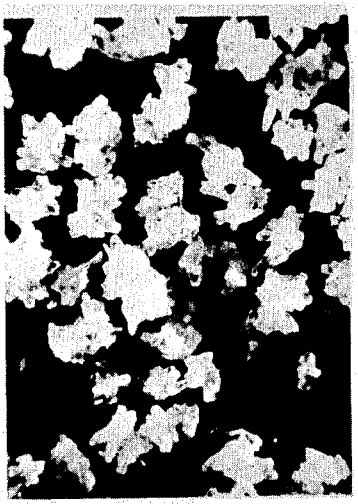
FIGURE 1 shows crystals of sodium bicarbonate formed by cooling a sodium bicarbonate solution, without the use of a surfactant.
Figure 2:
FIGURE 2 shows crystals of sodium bicarbonate formed by cooling in the presence of about 240 p.p.m. of dodecyl benzene sodium sulfonate.
Figure 3:
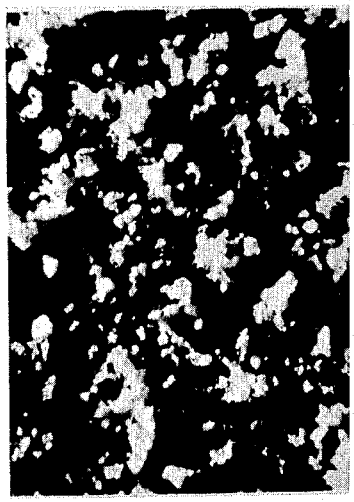
FIGURE 3 shows crystals of sodium bicarbonate formed in a typical ammonia-soda process operation, i.e., by the introduction of carbon dioxide gas into an aqueous brine containing sodium chloride and ammonia without the use of a surfactant.
Figure 4:
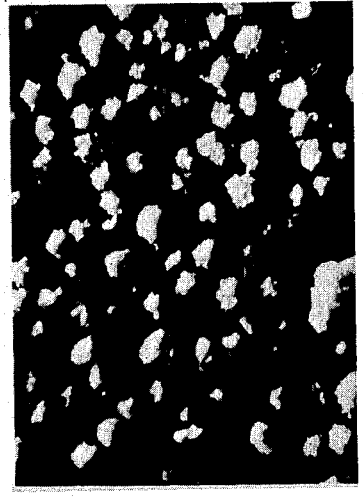

FIGURE 4 differs from FIGURE 3 in that the crystals shown were produced in the presence of about 320 p.p.m. of dodecyl benzene sodium sulfonate.

SHEET 2—SODIUM BICARBONATE CRYSTALS TAKEN AT 10.7× MAGNIFICATION

FIGURE 5 shows crystals of sodium bicarbonate formed by cooling a sodium bicarbonate solution without the use of a surfactant.

FIGURE 6 shows crystals of sodium bicarbonate formed by cooling in the presence of about 10 p.p.m. of dodecyl benzene sodium sulfonate.

FIGURE 7 shows crystals of sodium bicarbonate formed by cooling in the presence of about 20 p.p.m. of dodecyl benzene sodium sulfonate.

FIGURE 8 shows crystals of sodium bicarbonate formed by cooling in the presence of about 600 p.p.m. of dodecyl benzene sodium sulfonate.

FIGURE 9 shows crystals of sodium bicarbonate formed in a typical ammonia soda process operation, i.e., by introduction of carbon dioxide gas into an aqueous brine containing sodium chloride and ammonia without the use of a surfactant.

FIGURE 10 shows crystals of sodium bicarbonate formed similar to those of FIGURE 9 but in the presence of 40 p.p.m. of dodecyl benzene sodium sulfonate.

FIGURE 11 shows crystals of sodium bicarbonate formed similar to those of FIGURE 9 but in the presence of 200 p.p.m. of dodecyl benzene sodium sulfonate.

FIGURE 12 shows crystals of sodium bicarbonate formed similar to those of FIGURE 9 but in the presence of 400 p.p.m. of dodecyl benzene sodium sulfonate.

*Example 1*

Sodium bicarbonate prepared by the ammonia-soda (Solvay) process was extremely fine, in fact often so much so that it was difficult to obtain a screen analysis, due to excessive agglomeration. The bulk of the crystals passed a 300-mesh screen. Crystals made by this process had a water content after centrifuging of about 30 percent. The sodium chloride content of these crystals was about 0.21 percent, indicating a rather high occlusion of mother liquor in the crystals. These crystals are illustrated in FIGURE 3.

*Example 2*

A run made similar to Example 1, producing sodium bicarbonate by the Solvay process, but modified by the introduction of 160 p.p.m. of dodecyl benzene sodium sulfonate, gave greatly improved crystals. These crystals had a water content after centrifuging of about 14 percent, and the sodium chloride content had greatly decreased to a value of about 0.04 percent, indicating much less retention of mother liquor.

*Example 3*

Another run was made, similarly to Example 2, to prepare sodium bicarbonate by the Solvay process, but this time using about 320 p.p.m. of dodecyl benzene sodium sufonate. The crystals were again of greatly improved quality in comparison with crystals made without an additive, as shown in FIGURE 4.

Experimental work with numerous other surfactants using butyl naphthalene sodium sulfonate (Sorbit AC), sodium lauryl sulfate, triethanolamine lauryl sulfate, sodium-N-cyclohexyl-N-palmityl taurate (Igepon CX–42), sodium-N-methyl-N-oleyl-taurate (Igepon T–77) showed that the crystallization of sodium bicarbonate is improved in the same manner as with the use of dodecyl benzene sodium sulfonate, when about the same amounts of these surfactants on the active ingredient basis, is used. Nonionic, cationic-active, dyes and other types of additives were ineffective with sodium bicarbonate.

In the case of crystallizing other sodium carbonate salts, such as sodium sesquicarbonate in the presence of such surfactants as described in said application Serial No. 474,828, it was found that increasing the scale of operations, i.e., moving from laboratory to plant operations, permitted the use of considerably lower concentrations of additive, without substantially affecting the numerous advantages realized from the practice of this invention and in most cases actually gave superior results.

*Example 4*

In order to show further the beneficial effects of anionic surfactants of the classes herein described on the crystallization of sodium bicarbonate, solutions of commercial sodium bicarbonate (Arm and Hammer Baking Soda) saturated at 77° C. were prepared and sodium bicarbonate was crystallized therefrom in the presence of differing amounts of surfactant by cooling the solutions to 21° C. in 1½ hours. The heating and dissolving of the sodium bicarbonate resulted in considerable $CO_2$ evolution and the solutions saturated at 77° C. contained on an average 14.4% of $NaHCO_3$ and 3.3% of $Na_2CO_3$. After cooling the average mother liquor composition was 8.0% $NaHCO_3$ and 3.4% $Na_2CO_3$ for a saturation temperature of 29° C. For each test 72 gm. of Arm and Hammer Baking Soda and 328 ml. of distilled water were heated to 84° C. with stirring. Dodecyl benzene sodium sulfonate was added when the solution had cooled to 81° C. and at 78° C. an additional 10 gm. of $NaHCO_3$ was added, which also went into solution. Three drops of a defoamer were added just prior to the addition of the dodecyl benzene sodium sulfonate. About 25 gm. of crystals were obtained from each run.

The slurry was then centrifuged in a five inch diameter basket running at 1000 r.p.m. for two minutes to obtain the retained moisture value based on a total alkali analysis. The bulk density was determined by weighing 30 ml. of the crystals.

Because of the small size of $NaHCO_3$ crystals, the amount of mother liquor remaining with the filtered crystals is a problem in commercial production. A large amount of mother liquor decreases the purity of the product and if the crystals are calcined, the extra moisture reduces the efficiency of the calcination operation. Extensive washing of the crystal cake reduces the yield obtained.

As shown in Table I, the use of dodecyl benzene sodium sulfonate decreased the amount of liquor remaining with the crystals. Without the use of the surfactant the crystals grow together in irregular masses furnishing a large amount of capillary crevasses to hold the mother liquor. When a surfactant from the groups described previously, such as dodecyl benzene sodium sulfonate, is present the crystals are larger and there is a marked decrease in twinning, this reduces the amount of mother liquor held in the cake.

TABLE I.—PERCENT SURFACTANT VS. RETAINED MOTHER LIQUOR IN THE CENTRIFUGE CAKE

| Dodecyl benzene sodium sulfonate concentration in crystallizer liquor, p.p.m.: | Percent liquor in cake |
|---|---|
| 0 | 7.9 |
| 10 | 5.5 |
| 20 | 4.2 |
| 20 | 2.8 |
| 200 | 3.2 |

The bulk density of the crystals increased very rapidly when a small amount of surfactant from the groups described was used. Without the surfactant the crystal clusters had a bulk density of only 31 lbs./ft.$^3$. Calcination of these crystals to produce soda ash resulted in a bulk density of 18 lb./ft.$^3$. At 400 p.p.m. of dodecyl benzene sodium sulfonate, the bulk density reached a maximum of 56 lb./ft.$^3$ (which crystals calcined to a bulk density of 33 lb./ft.$^3$) and then, because of increased crystal twinning at higher surfactant concentrations, the bulk density decreased. Bulk density values are given in Table II.

TABLE II.—PERCENT SURFACTANT VS. $NaHCO_3$ BULK DENSITY

| Dodecyl benzene sodium sulfonate concentration in crystallizer liquor, p.p.m.: | Bulk density, lb./ft.$^3$ |
|---|---|
| 0 | 31 |
| 10 | 39 |
| 20 | 44 |
| 40 | 46 |
| 200 | 53 |
| 400 | 56 |
| 600 | 31 |
| 800 | 43 |

FIGURES 5, 6, 7 and 8 illustrate the change in crystal habit and size brought about by the use of anionic surfactants of the named groups in the cooling crystallization of sodium bicarbonate.

In FIGURE 5 the crystals obtained without the use of a surfactant or crystallization modifier are small and agglomerated together. In FIGURE 6 with the use of 10 p.p.m. dodecyl benzene sodium sulfonate the crystals are bigger and do not agglomerate together to the same extent. In FIGURE 7 with the use of 20 p.p.m. of an anionic surfactant or crystallization modifier some of the crystals resemble a bow tie and the crystals are larger than in FIGURE 5 and there are fewer agglomerates. In FIGURE 8 with the use of 600 p.p.m. of the anionic surfactant the crystals are still larger although more irregular in shape and with more twinning and agglomeration than in FIGURE 7.

*Example 5*

To further show the effect of anionic surfactants, from the classes herein described, in the ammonia-soda (Solvay process) of producing sodium bicarbonate crystals for calcining into soda ash, different concentrations of an anionic surfactant, typified by dodecyl benzene sodium sulfonate, were added to solutions of ammonia and sodium chloride and sodium bicarbonate was crystallized therefrom by carbonating the liquor with carbon dioxide by the following procedure:

Concentrated $NH_4OH$ was saturated with NaCl by stirring with an excess of NaCl. Five hundred grams of the clear supernatant liquor was transferred to a 1000 ml. graduated cylinder. Carbon dioxide was added at the rate of 0.7 liter/min., or 1.54 ft.$^3$ gas/min.-ft.$^3$ solution. When crystals first appeared the dodecyl benzene sodium sulfonate was added and the carbonation was continued for one hour at the same rate. No defoamer was required in any of these tests. The settling rate was measured in the graduated cylinder and then the crystals were centrifuged as described in Example 4. The retained moisture was determined by weighing the wet centrifuge cake and reweighing when dry. Bulk density was measured by weighing 100 ml. of dry crystals. The average yield by this method was 85 gm. of $NaHCO_3$ crystals.

The crystals produced without the dodecyl benzene sodium sulfonate were very small and settled at a rate of 0.64 in./min. With the use of an anionic surfactant the settling rate was much faster. The rate for all tests is shown in Table III. The settling rate at 200 p.p.m. dodecyl benzene sodium sulfate is considerably slower than expected, but these crystals were not twinned and agglomerated as were the 40 and 400 p.p.m. settling tests.

TABLE III.—SETTLING RATE OF AMMONIA-SODA CRYSTALS

| Dodecyl benzene sodium sulfonate concentration in crystallizer liquor, p.p.m.: | Settling rate, in./min. |
|---|---|
| 0 | 0.64 |
| 40 | 3.42 |
| 200 | 1.41 |
| 400 | 4.2 |

A decrease in centrifuge cake moisture was obtained when dodecyl benzene sodium sulfonate was used during crystal growth, as shown in Table IV.

TABLE IV.—CENTRIFUGE CAKE MOISTURE

| Dodecyl benzene sodium sulfonate concentration in crystallizer liquor, p.p.m.: | Percent retained moisture |
|---|---|
| 0 | 14.3 |
| 40 | 8.3 |
| 200 | 5.8 |
| 400 | 6.3 |

An increase in bulk density was obtained when using the anionic surfactant described. After the crystals were calcined the crystals formed in the presence of 0 p.p.m. surfactant had a bulk density of 17 lb./ft.$^3$. At 400 p.p.m. surfactant the bulk density of the calcined material was 24.5 lb./ft.$^3$.

FIGURES 9, 10, 11 and 12 illustrate the change in crystal habit and size brought about by the use of anionic surfactants of the classes described in the ammonia-soda process of producing sodium bicarbonate crystals.

In FIGURE 9 the crystals obtained without the use of a surfactant or crystallization modifier of the types described herein are very small, and with no characteristic shape. Most of the crystals have formed into irregularly shaped, loosely-knit agglomerates. In FIG. 10 the crystals formed in the presence of 40 p.p.m. of dodecyl benzene sodium sulfonate are still small, however, the agglomerates are more solid and larger. In FIGURE 11 formed in the presence of 200 p.p.m. of an anionic surfactant the individual crystals are much larger than those shown in FIGURE 10 and although the crystals are still twinned, there are fewer agglomerates and the crystals are long and rod shaped, having a length to width ratio of about 8:1. The fact that these are not agglomerates explains the slower settling rate shown in Table III. In FIGURE 12 the crystals are also larger rod-like individual crystals which produce a superior soda ash to the crystals of FIGURE 9.

The bulk density (B.D.) of the respective crystals illustrated in FIGURES 9, 10, 11 and 12 is shown in Table V.

TABLE V

| P.p.m. Additive | 0 | 40 | 200 | 400 |
|---|---|---|---|---|
| B.D of dry NaHCO$_3$ crystals, lbs./ft.$^3$ | 21.8 | 31.2 | 33.9 | 35.4 |
| B.D. of calcined NaCO$_3$ crystals, lbs./ft.$^3$ | 17.2 | 20.6 | 20.7 | 24.5 |

The use of other anionic surfactants from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms, and (4) N-substituted taurines of the formula R'R"NCH$_2$CH$_2$SO$_3$M where R' is a hydrocarbon radical, R" is the acyl radical of a higher fatty acid and M is an alkali metal and other anionic surfactants of similar properties, likewise improves the crystallization of sodium bicarbonate crystals from solutions in the manner herein described.

It should be understood that the foregoing descriptive and illustrative materials represent only typical embodiments of the invention and are not to be construed as limiting the scope thereof, as defined by the claims which follow.

We claim:
1. A process for preparing crystals of sodium bicarbonate which crystals are improved in size, dewatering ability and settling rate, which comprises effecting the crystallization of sodium bicarbonate crystals from an aqueous solution in the presence of about 10 to about 800 parts per million of an anionic active surfactant selected from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms, and (4) N-substituted taurines of the formula R'R"NCH$_2$CH$_2$SO$_3$M where R' is a hydrocarbon radical, R" is the acyl radical of a higher fatty acid and M is an alkali metal.

2. The process of claim 1 wherein the salt being crystallized is sodium bicarbonate and the surfactant is present in the aqueous solution prior to crystallization in a concentration of from about 40 to about 200 parts per million active material.

3. The process of claim 1 wherein the surfactant is an alkyl benzene sulfonate containing at least 8 carbon atoms.

4. The process of claim 1 wherein the surfactant is an alkyl naphthalene sulfonate containing at least 4 alkyl carbon atoms.

5. The process of claim 1 wherein the surfactant is a primary alcohol sulfate containing at least 10 carbon atoms.

6. The process of claim 1 wherein the surfactant is an N-substituted taurine of the formula

R'R"NCH$_2$CH$_2$SO$_3$M where R' is a hydrocarbon radical, R" is the acyl radical of a higher fatty acid and M is an alkali metal.

7. A process of preparing large, uniform-sized, easily dewatered crystals of sodium bicarbonate by initial crystallization from a saturated aqueous plant solution in the presence of about 5 to about 400 parts per million active material of a branched alkyl chain dodecyl benzene sulfonate and separating said crystals from said saturated solution.

8. A process for preparing substantially pure sodium bicarbonate composed of large individual, substantially non-adherent, long rod-like crystals, said sodium bicarbonate being produced by carbonation and crystallization from an ammonia-salt solution in the presence of about 5 to about 400 parts per million of a surface active crystal promoting agent, selected from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms, and (4) N-substituted taurines of the formula

R'R" NCH$_2$CH$_2$SO$_3$M where R' is a hydrocarbon radical, R" is the acyl radical of a higher fatty acid and M is an alkali metal, said crystals having a higher settling rate, a lower percentage of retained moisture in the centrifuge cake and a higher bulk density than sodium bicarbonate crystals crystallized from a similar solution in the absence of said agent.

References Cited in the file of this patent

UNITED STATES PATENTS

| 1,766,705 | Dehnel | June 24, 1930 |
| 2,607,660 | Robertson | Aug. 19, 1952 |
| 2,670,269 | Rahn | Feb. 23, 1954 |
| 2,720,446 | Whetstone | Oct. 11, 1955 |
| 2,954,282 | Bauer et al. | Sept. 27, 1960 |

OTHER REFERENCES

J. W. Perry et al.: "Surface Active Agents," Interscience Publ., N.Y., 1949, page 102.